US011923161B2

(12) United States Patent
Herrera Ortiz et al.

(10) Patent No.: US 11,923,161 B2
(45) Date of Patent: Mar. 5, 2024

(54) SHUNT TRIP CIRCUIT INTERRUPTER

(71) Applicant: EATON INTELLIGENT POWER LIMITED, Dublin (IE)

(72) Inventors: Ruben Gamaliel Herrera Ortiz, Santo Domingo Este (DO); Evelyn Patricia Baez Lorenzo, Distrito Nacional (DO); Ramon Alexander Perez Suarez, Distrito Nacional (DO); Glennys Johanny De Jesus Reyes, San Cristóbal (DO); Luis Jose Ynfante Peña, Santiago de los Caballeros (DO)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/715,611

(22) Filed: Apr. 7, 2022

(65) Prior Publication Data

US 2023/0326695 A1 Oct. 12, 2023

(51) Int. Cl.
*H01H 71/12* (2006.01)
*H01H 50/02* (2006.01)
*H01H 50/16* (2006.01)
*H01H 50/54* (2006.01)

(52) U.S. Cl.
CPC ............ *H01H 50/54* (2013.01); *H01H 50/02* (2013.01); *H01H 50/16* (2013.01); *H01H 71/12* (2013.01)

(58) Field of Classification Search
CPC ...................................................... H01H 71/12
USPC .......................................................... 335/172
See application file for complete search history.

(56) References Cited

U.S. PATENT DOCUMENTS 5,089,796 A * 2/1992 Glennon ................ H01H 83/22 335/177
5,260,676 A * 11/1993 Patel .................. H01H 71/1009 335/132
6,255,923 B1 * 7/2001 Mason, Jr. ............. H01H 83/20 361/42
6,477,022 B1 * 11/2002 Ennis ..................... H01H 89/06 361/42
7,414,498 B2 * 8/2008 McCoy .................. H01H 71/04 335/23
7,986,203 B2 * 7/2011 Watford ............. H01H 71/0271 335/22
8,134,428 B2 * 3/2012 Watford ............... H01H 71/123 335/106

(Continued)

*Primary Examiner* — Alexander Talpalatski
(74) *Attorney, Agent, or Firm* — Eckert Seamans Cherin & Mellott, LLC

(57) ABSTRACT

A Shunt Trip Circuit Interrupter is to be installed within an electrical panel and includes a number of sets of separable contacts, a housing, an operating mechanism structured to move each set of separable contacts between at least an ON condition and an OFF condition, and a tripping mechanism situated within an interior of the housing and including an electronic circuit, a solenoid electrically connected with the electronic circuit, and a wire electrically connected with the electronic circuit and extending between the electronic circuit and an exterior of the housing, the wire being structured to be electrically connected with a switch system having at least one of a manual switch and an electronic switch that, when actuated, actuates the solenoid that engages the operating mechanism which moves each set of separable contacts from the ON condition to the OFF condition.

9 Claims, 8 Drawing Sheets

(56) References Cited

U.S. PATENT DOCUMENTS 11,322,328 B2 * 5/2022 Hiremath .............. H01H 69/00

* cited by examiner

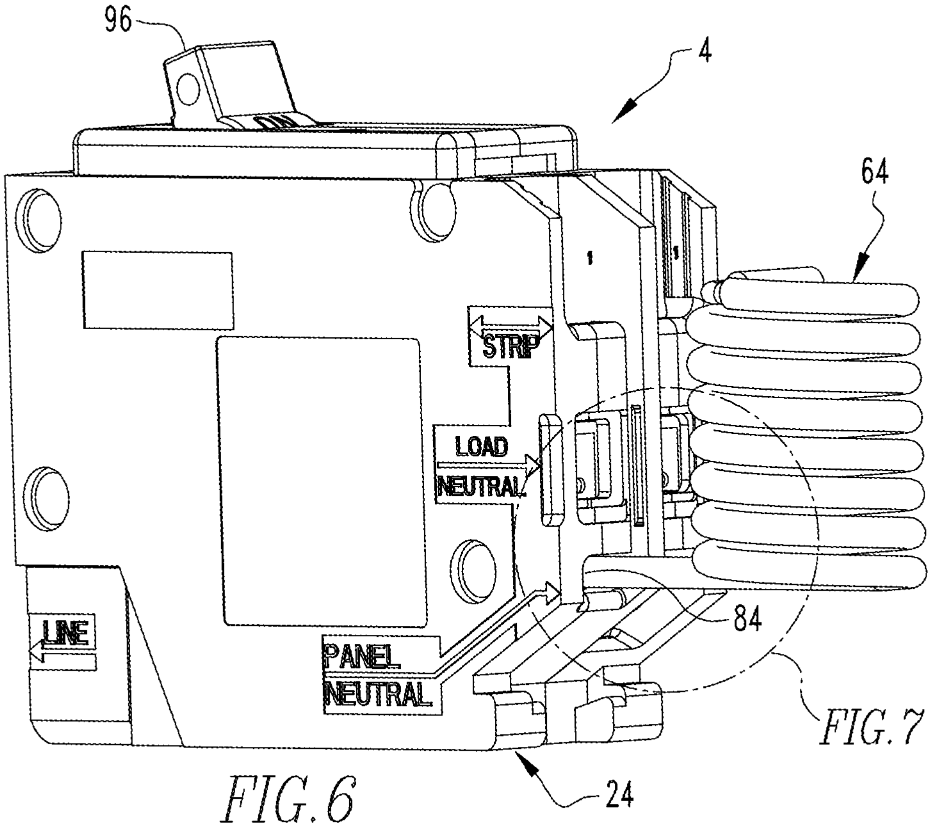
FIG. 6
FIG. 7
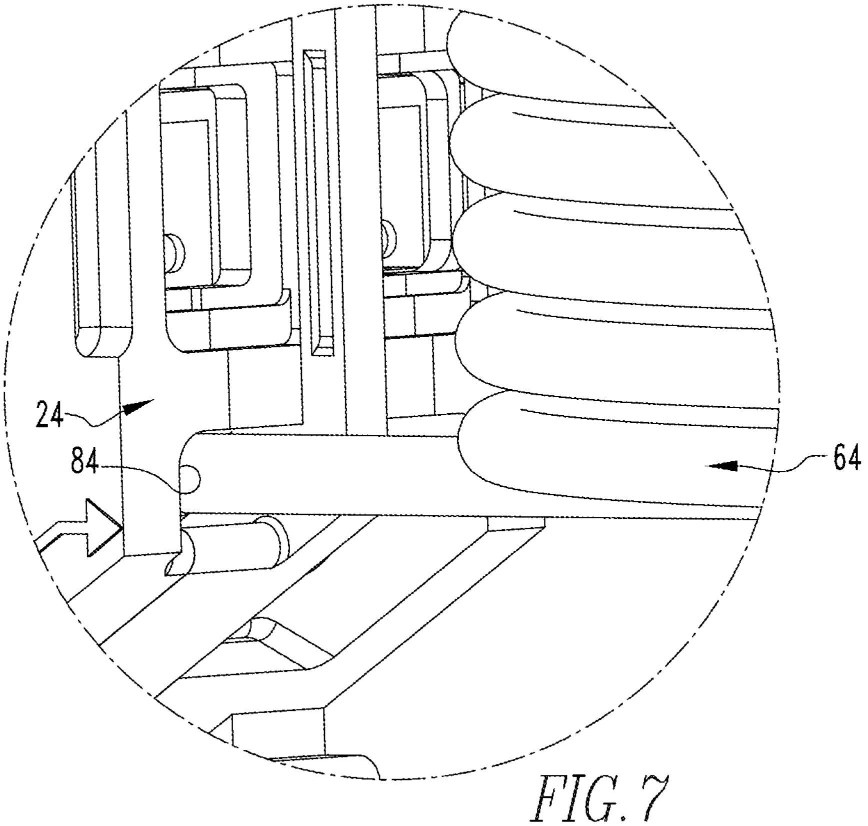
FIG. 7

SHUNT TRIP CIRCUIT INTERRUPTER

BACKGROUND

Field

The disclosed concept relates generally to circuit interrupters and, more particularly, to a shunt trip circuit interrupter.

Background Information

Circuit interrupters are employed in diverse capacities. A circuit interrupter may include, for example, a fixed contact and a movable contact, with the movable contact being movable into and out of electrically conductive engagement with the fixed contact. This changes the circuit interrupter between an ON or closed position and an OFF or open position, or between the ON or closed position and a TRIPPED or tripped OFF position.

One type of the circuit interrupter is a shunt trip circuit interrupter of a type that includes a switch of some kind that is in series with a power supply and that is remote from the circuit interrupter. Actuation of this switch trips the circuit interrupter from the ON position to either the OFF position or the TRIPPED position by actuating a solenoid that is situated within the case of the circuit interrupter. Unfortunately, however, the solenoid typically is situated on a circuit board that is also situated within the case, with the result that the case is oversized compared with the number of holes that the circuit interrupter has. For instance, a single pole shunt trip circuit interrupter includes a case that occupies two slots within an electrical panel, i.e., a two-slot case, with the set of separable contacts and the mechanism occupying one slot-occupying portion of the case and with the circuit board and solenoid occupying another slot-occupying portion of the case. Such shunt trip circuit interrupters thus undesirably occupy more slots of and electrical panel than is desirable. There is, therefore, room for improvement in shunt trip circuit interrupters.

SUMMARY

These needs and others are met by embodiments of the disclosed concept, which are directed to an improved shunt trip circuit interrupter.

As one aspect of the disclosed concept, a Shunt Trip Circuit Interrupter (STCI) is structured to be installed within an electrical panel and being structured to be electrically connected between a line and a load of each of a number of poles of the electrical panel, the electrical panel having a quantity of receptacles each having at most only a single pole of the number of poles. The STCI can be generally stated as including a number of sets of separable contacts, each set of separable contacts of the number of sets of separable contacts can be generally stated as including a contact and another contact, the contact being structured to be electrically connected with one of the line and the load, the another contact being structured to be electrically connected with the other of the line and the load, a housing having an interior within which the number of sets of separable contacts are situated, the housing being structured to occupy at most only an amount of receptacles of the electrical panel equal to the number of sets, an operating mechanism situated within the interior and structured to move each set of separable contacts of the number of sets of separable contacts between at least an ON condition wherein the contact and the another contact are electrically connected together and an OFF condition wherein the contact and the another contact are electrically disconnected from one another, and a tripping mechanism situated within the interior and can be generally stated as including an electronic circuit, a solenoid electrically connected with the electronic circuit, and a wire electrically connected with the electronic circuit and extending between the electronic circuit and an exterior of the housing, the wire being structured to be electrically connected with a switch system that can be generally stated as including at least one of a manual switch and an electronic switch that, when actuated, actuates the solenoid that engages the operating mechanism which moves each set of separable contacts from the ON condition to the OFF condition.

BRIEF DESCRIPTION OF THE DRAWINGS

A full understanding of the disclosed concept can be gained from the following description of the preferred embodiments when read in conjunction with the accompanying drawings in which:

FIG. 6 is another view of the first embodiment, showing an exterior thereof;

FIG. 7 is an enlargement of a portion of FIG. 6;

DESCRIPTION OF THE PREFERRED EMBODIMENTS

Figure 13:
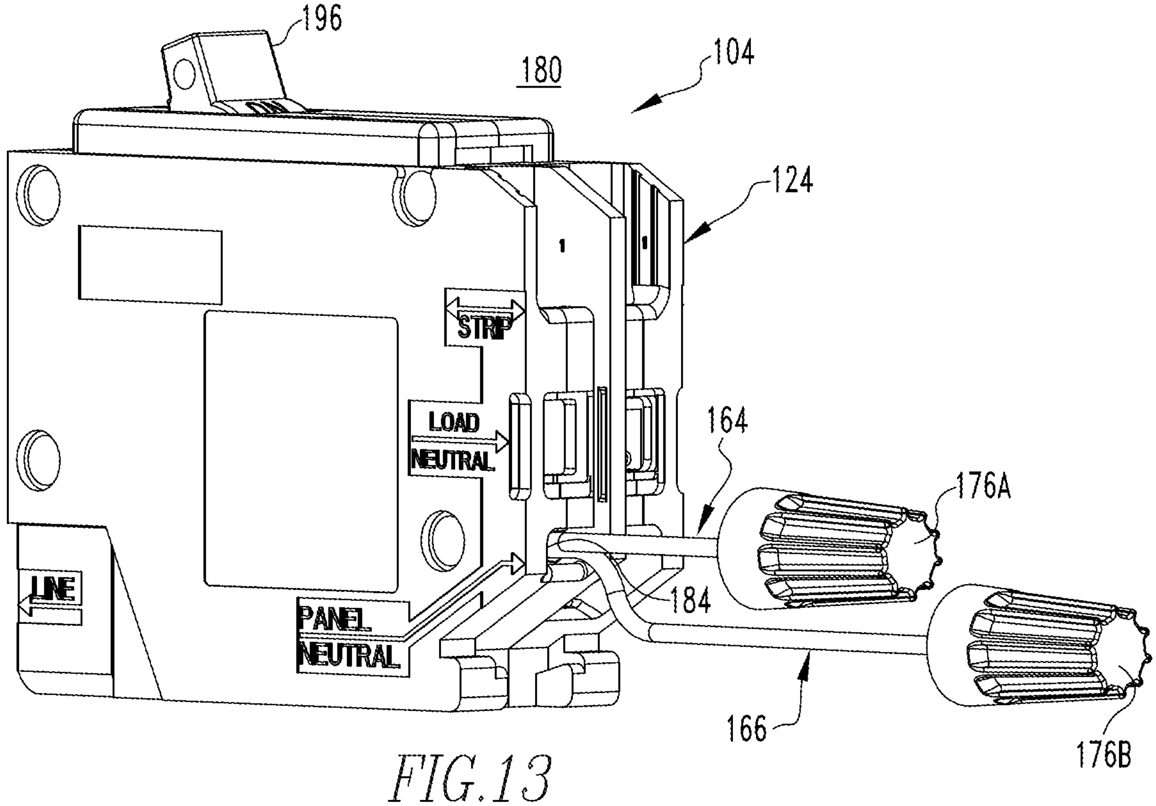
FIG. 13 is another view of the second embodiment, showing an exterior thereof.

An improved shunt trip circuit interrupter (STCI or circuit interrupter) 4 in accordance with a first embodiment of the disclosed and claimed concept is depicted generally in FIGS. 1, 4, and 6-12. It is further noted that an improved shunt trip circuit interrupter (STCI or circuit interrupter) 104 in accordance with a second embodiment of the disclosed and claimed concept is depicted generally in FIGS. 2, 5, and 13. Moreover, it is noted that the circuit interrupters 4 and 104 are together depicted as being installed on an exemplary electrical panel 8 that is depicted in FIG. 3. The circuit interrupters 4 and 104 are similar to one another but include differences that are set forth in greater detail elsewhere herein.

As can be understood from FIG. 3, the exemplary electrical panel 8 includes a total of six receptacles that are indicated at the numerals 12A, 12B, 12C, 12D, 12E, and 12F, that are collectively or individually referred to herein with the numeral 12, and that are situated adjacent one another. The electrical panel 8 has a pair of lines 14A and 14B that are electrically connected therewith and that form of a pair of poles 16A and 16B, respectively. The electrical panel 8 additionally has a neutral conductor 18 that is electrically connected therewith.

A pair of the circuit interrupters 4 are depicted as being situated in the receptacles 12B and 12C, and a single one of the circuit interrupters 104 is depicted as being situated in the receptacle 12D. The receptacles 12A, 12E, and 12F are depicted as being empty and are thus free of circuit interrupters 4 and 104. Furthermore, it is noted that the pair of electrical interrupters 4 that are depicted in the receptacles 12B and 12C each include a load line 20A and 20B that are connected with electrical loads of those circuits, and the circuit interrupter 104 that is situated in the receptacle 12D includes a load line 20C that is likewise electrically connected with a load of that circuit.

Figure 1:
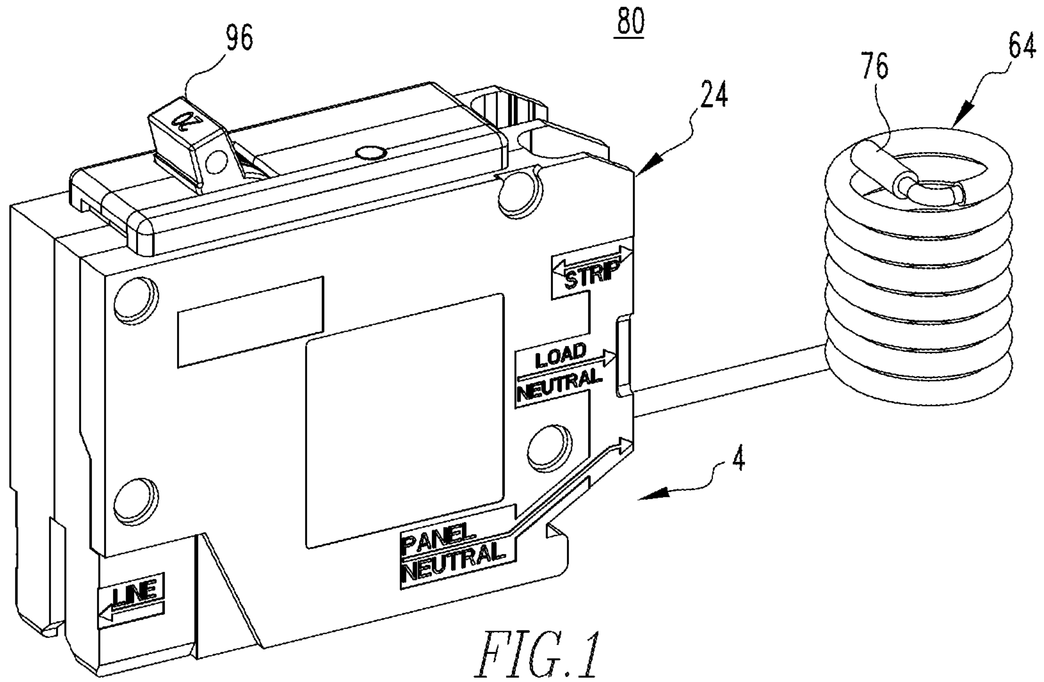
FIG. 1 is a perspective view of an improved shunt trip circuit interrupter in accordance with a first embodiment of the disclosed and claimed concept.
Figure 4:
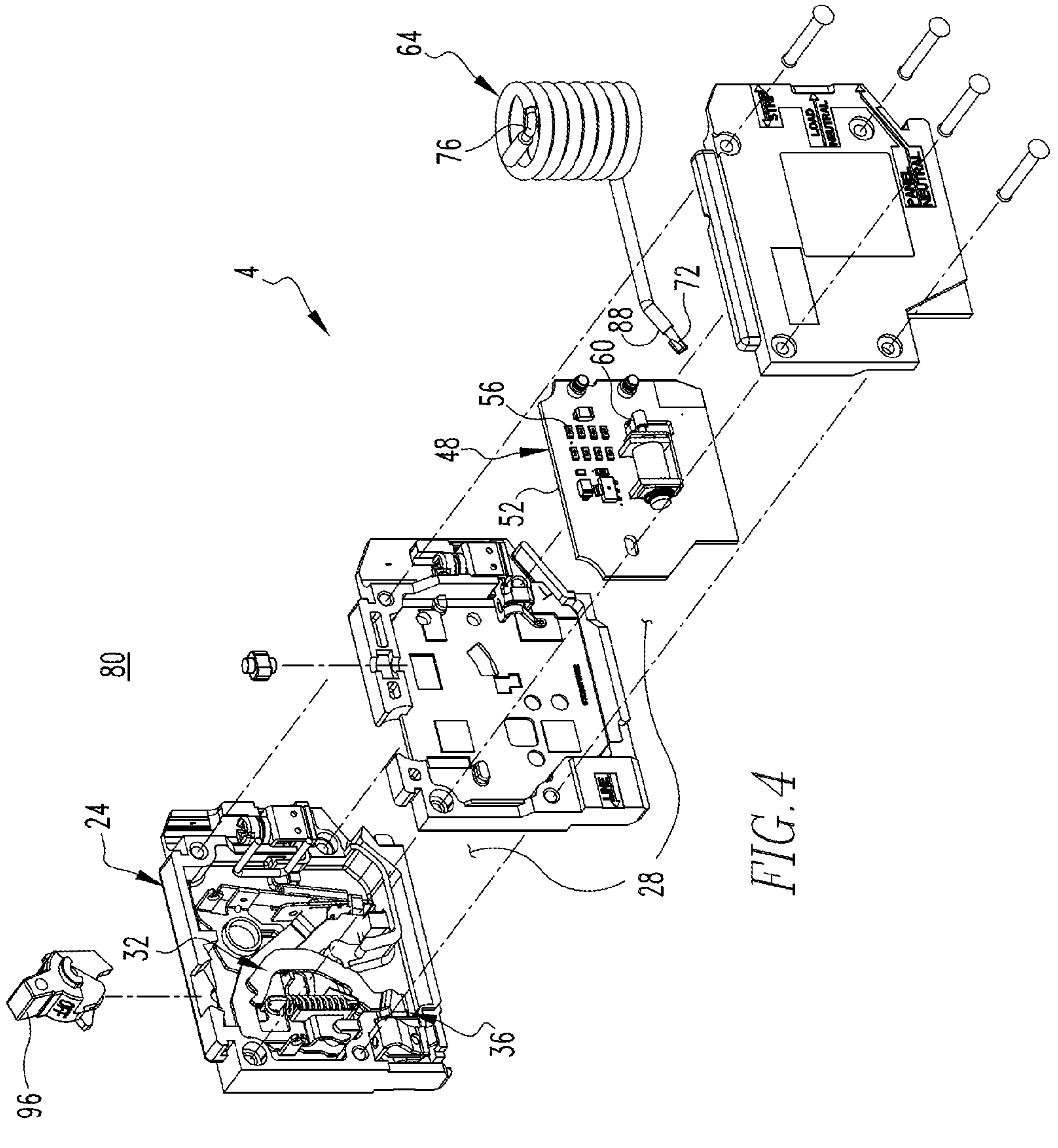
FIG. 4 is an exploded view of the first embodiment.

As can be understood from FIGS. 1 and 4, each circuit interrupter 4 includes a housing 24 having an interior 28 within which is situated an operating mechanism 32 having a set of separable contacts 36 that includes a movable contact 40 and a stationary contact 44. The set of separable contacts 36 are movable between an ON position, such as is depicted generally in FIG. 9A, wherein they are electrically connected together, and either an OFF position or a TRIPPED position, such as is depicted generally in FIG. 9B, wherein they are electrically disconnected with one another. Such movement of the set of separable contacts 36 is controlled by operation of the operating mechanism 32.

As can be understood in FIG. 4 and elsewhere herein, the circuit interrupter 4 further includes a tripping mechanism 48. As depicted herein, the tripping mechanism 48 includes a circuit board 52 upon which is formed an electronic circuit 56 which, in the depicted exemplary embodiment, is a printed circuit. The tripping mechanism 48 further includes a solenoid that is mounted to the circuit board 52 and that is electrically connected with the electronic circuit 56. The tripping mechanism 48 includes a wire 64 that is electrically connected with the electronic circuit 56 and that is electrically connectable with and that may itself include a switch system 68.

More particularly, the wire 64 can be said to include a first end 72 that forms an electrical connection 78 with the electronic circuit 56 and that further includes a second end 76 that is opposite the first end 72 and that is situated at an exterior of the housing 24. The second end 76 is electrically connectable with the switch system 68. The housing 24 has formed therein an opening 84 that forms a passage between the interior 28 and the exterior 80 of the housing 24. It can be seen that the wire 64 includes another portion 88 that is situated between the first and second ends 72 and 76 and that extends through the opening 84.

It is also noted that the operating mechanism 32 additionally includes an actuator knob 96 that protrudes through the housing 24 and is situated at least partially at the exterior 80 of the housing 24 and is usable to operate the operating mechanism 32. It is particularly noted that the circuit interrupter 4 is advantageously free of any other actuators or buttons that are situated in whole or in part at the exterior 80 of the housing 24, other than the actuator 96.

Figure 2:
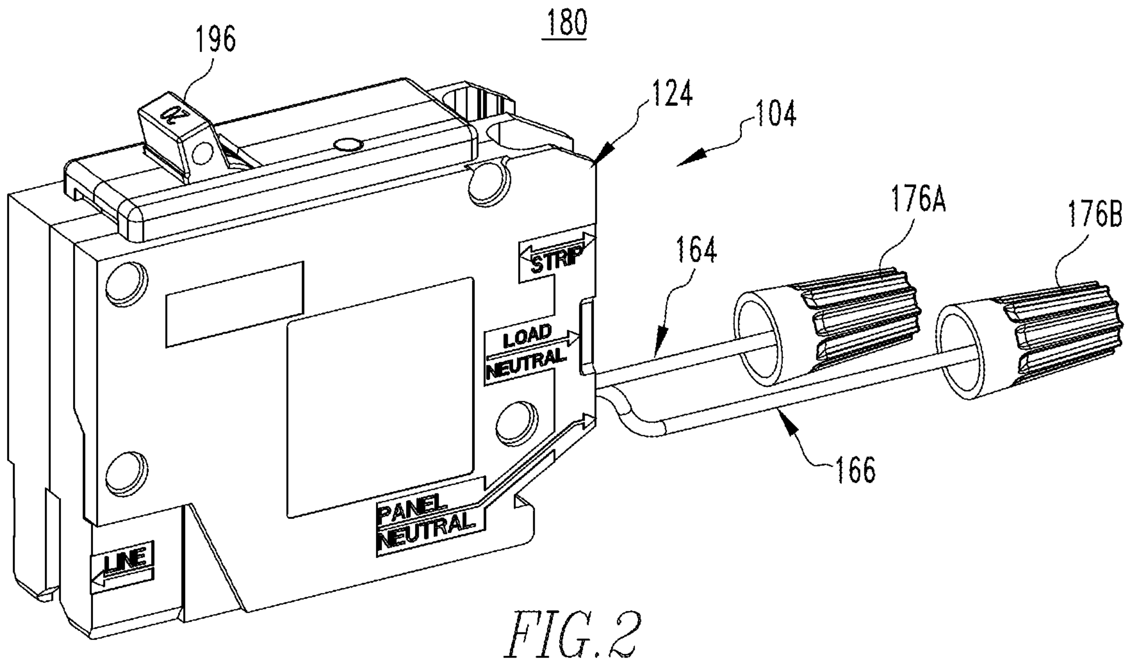
FIG. 2 is a perspective view of an improved shunt trip circuit interrupter in accordance with a second embodiment of the disclosed and claimed concept.
Figure 3:
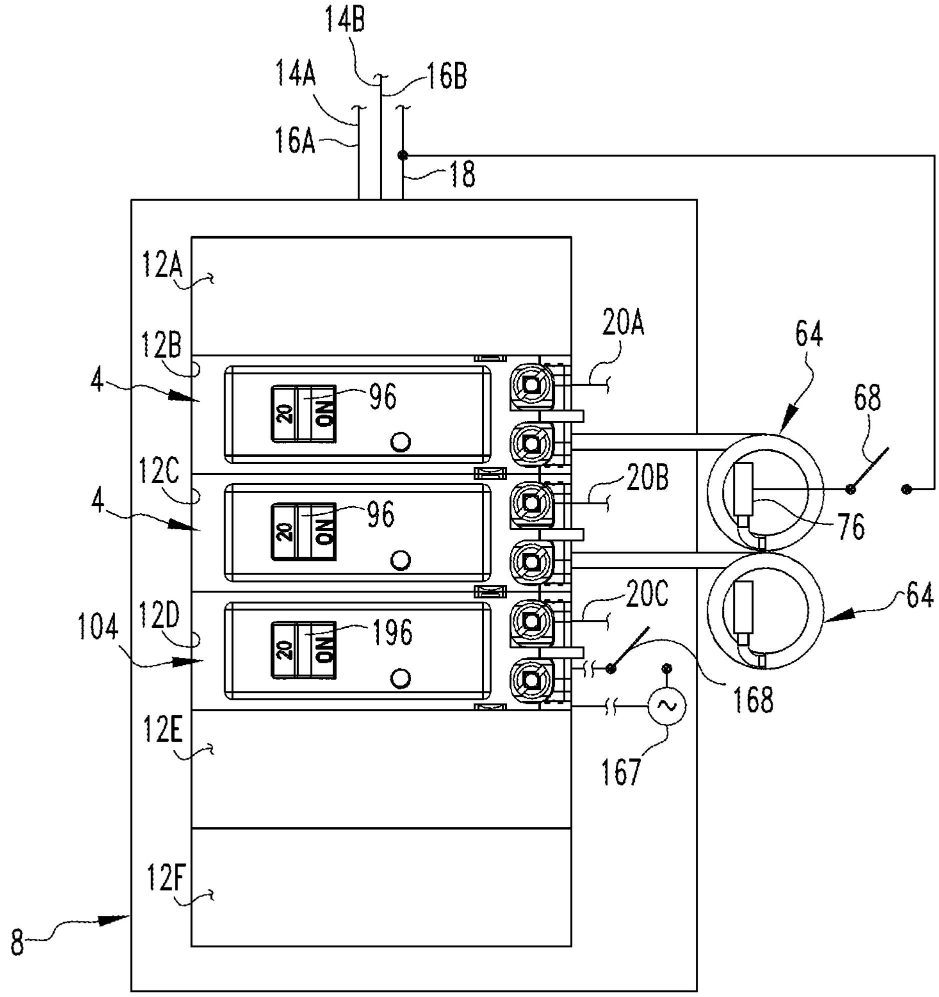
FIG. 3 is an exemplary frontal view of an electrical panel in which examples of both the first embodiment and the second embodiment are installed.
Figure 5:
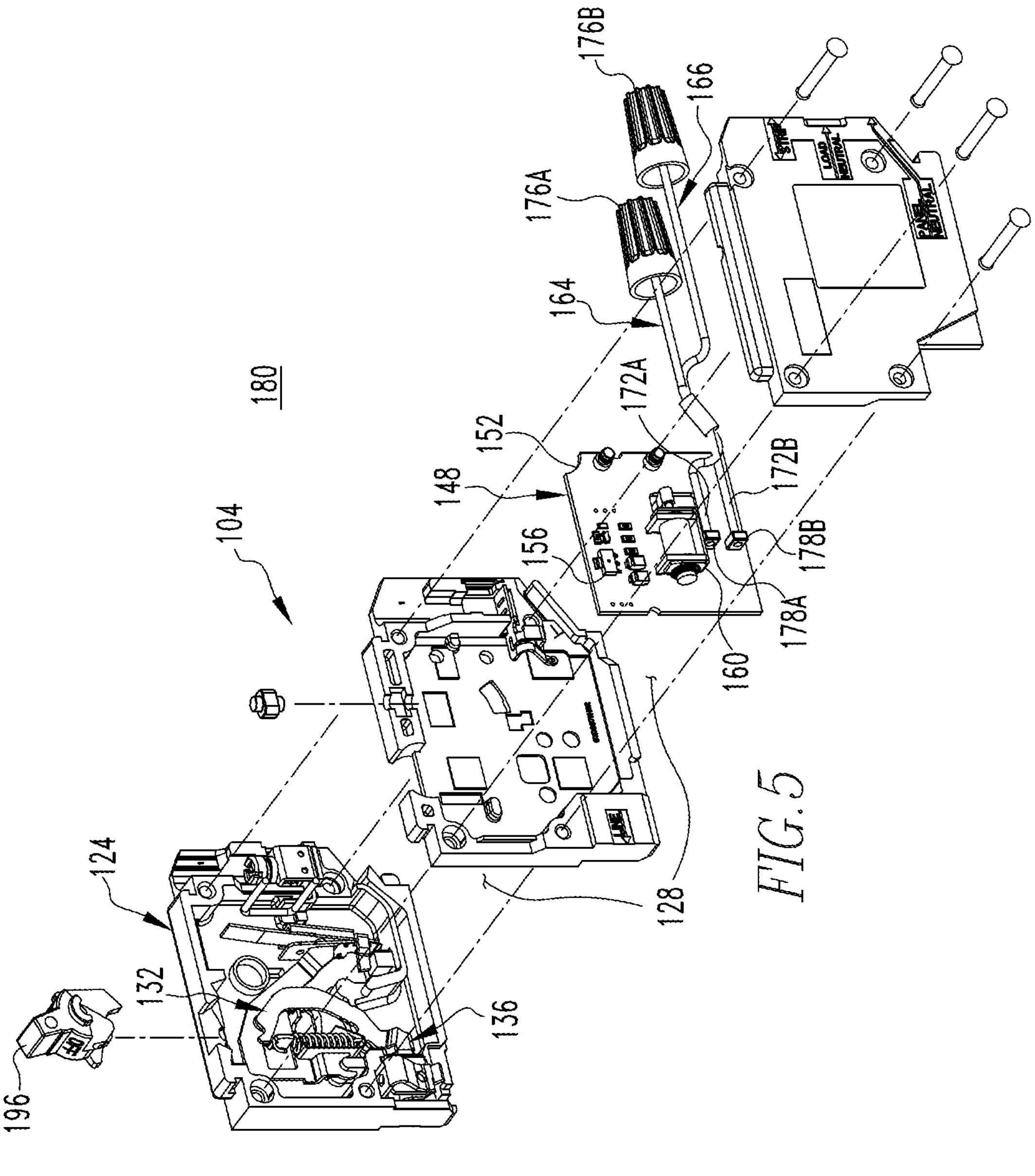
FIG. 5 is an exploded view of the second embodiment.
Figure 8:
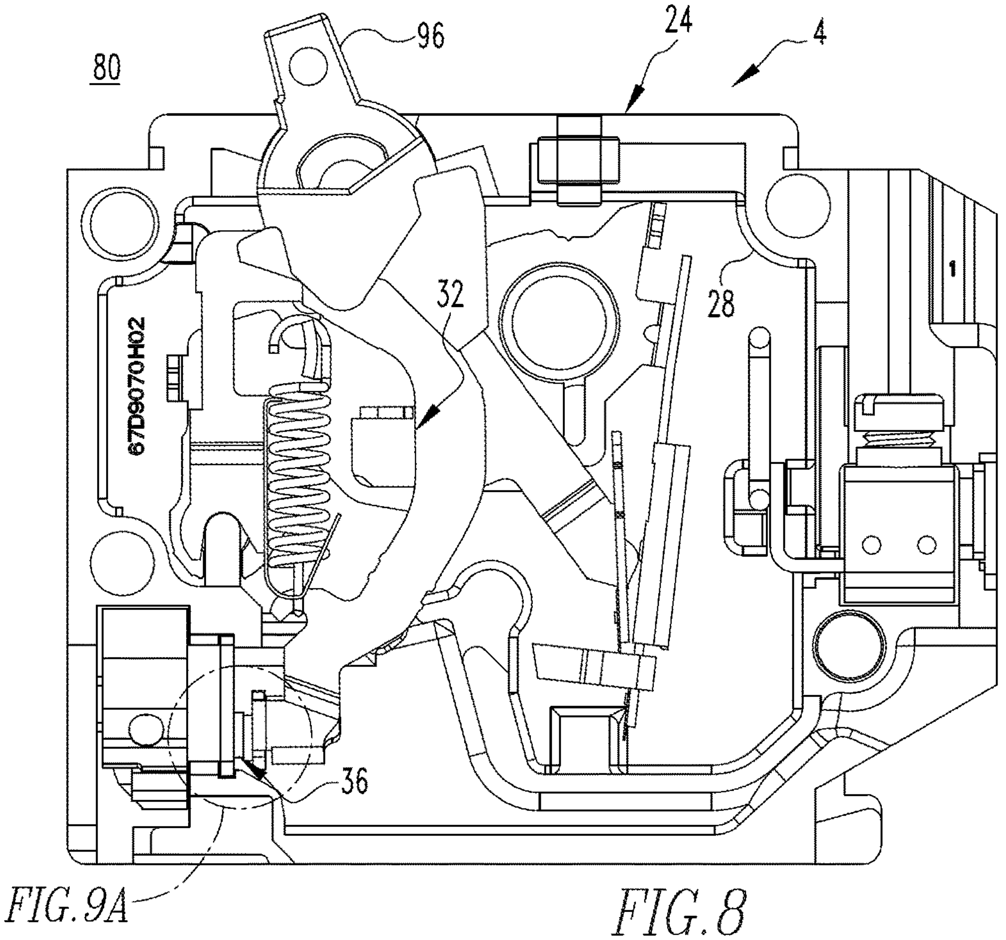
FIG. 8 is an enlarged frontal view of a portion of the first embodiment that is depicted in a perspective fashion in FIG. 4 and that depicts a portion of a housing of the shunt trip circuit interrupter upon which are situated an operating mechanism thereof upon which are situated a set of separable contacts that are in an ON condition.
Figure 9A:
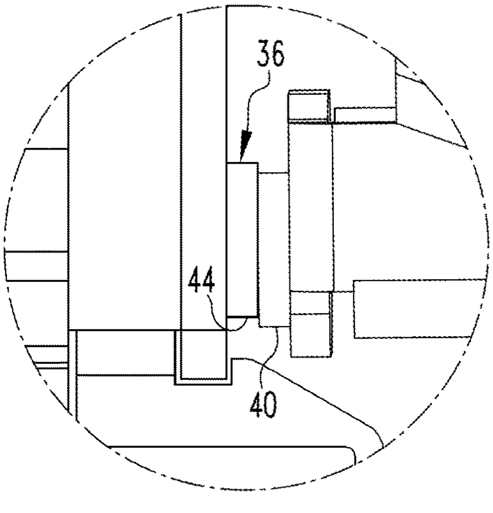
FIG. 9A and is an enlargement of a portion of FIG. 8 and depicting the set of separable contacts in the ON condition.
Figure 9B:
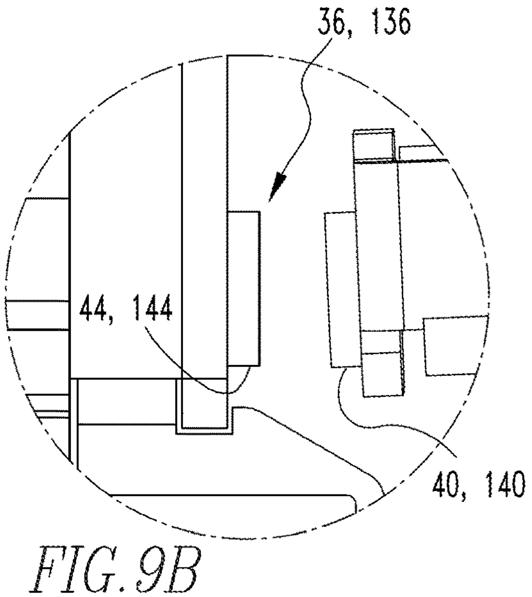
FIG. 9B and is a view similar to FIG. 9A, except that it depicts a set of separable contacts that is representative of that contained by each of the first and second embodiments of the shunt trip circuit interrupter in an OFF condition or a TRIPPED condition.
Figure 10:
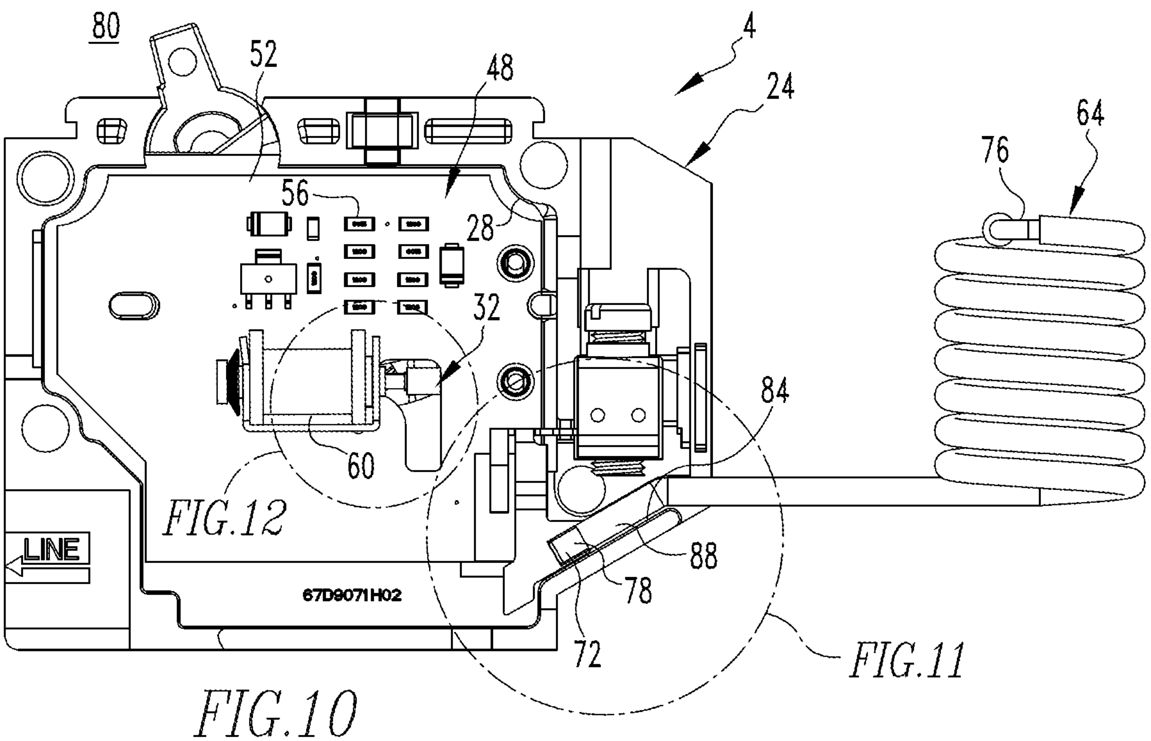
FIG. 10 is a view similar to FIG. 8, except additionally depicting a tripping mechanism of the shunt trip circuit interrupter, that is depicted in FIG. 4 in a condition exploded away from the operating mechanism, but that is depicted in FIG. 10 is overlying the operating mechanism and having a solenoid that is cooperative with the operating mechanism.
Figure 11:
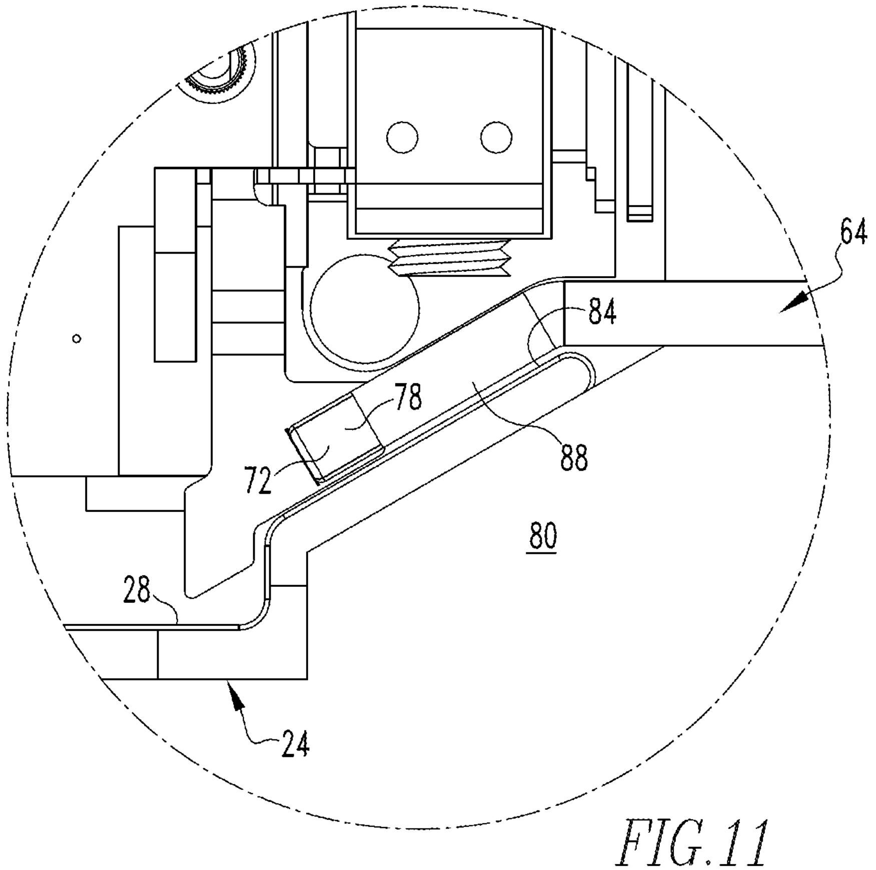
FIG. 11 is an enlargement of an indicated portion of FIG. 10.
Figure 12:
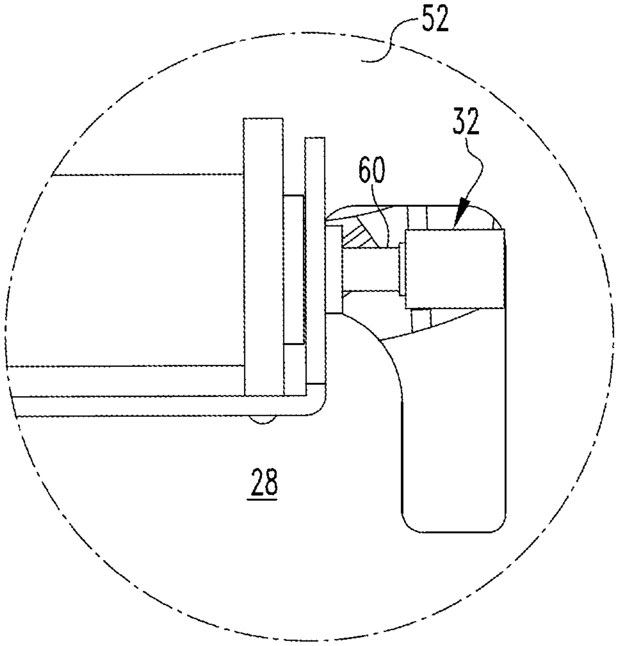
FIG. 12 is an enlargement of another indicated portion of FIG. 10.

As can be understood from FIGS. 2 and 5, the circuit interrupter 104 is similar to the circuit interrupter 4 and likewise includes a housing 124 having an interior 128 and having an operating mechanism 132 that is situated within the interior 128 and that includes a set of separable contacts 136. As can be understood from FIG. 9B, the set of separable contacts 136 include a movable contact 140 and a stationary contact 144 that are movable between an ON position and an OFF or TRIPPED position, and this is due to operation of a tripping mechanism 148. The tripping mechanism 148 includes a circuit board 152 that includes an electronic circuit 156 and that further includes a solenoid that is situated on the circuit board 152 and that is electrically connected with the electronic circuit 156. The tripping mechanism 148 includes a wire 164 that is electrically connected with the electronic circuit 156, but tripping mechanism 148 further additionally includes another wire 166 that is likewise electrically connected with the electronic circuit 156. The wire 164 and the another wire 166 are each electrically connected with a power source 167 via a switch system 168 that itself may be considered to be a part of the tripping mechanism 148.

The wire 164 has a first end 172A that forms an electrical connection 178A with the electronic circuit 156, and the another wire 166 has a first end 172B that forms another electrical connection 178B with the electronic circuit 156. The wire 164 and the another wire 166 each include a second end 176A and 176B, respectively, that are situated at an exterior 180 of the housing 124, and one of which is electrically connectable with switch system 168, and the other of which is electrically connectable with the power source 167. The wire 164 and the another wire 166 both extend through an opening 184 formed in the housing 124. The operating mechanism 132 likewise includes an actuator knob 196 that is situated at the exterior 180 of the housing 124, and the circuit interrupter 104 is free of any other actuators or buttons that are situated at the exterior 180.

On the circuit interrupter 4, when the switch system 68 is actuated, electricity flows from the electronic circuit 56 through the wire 64 and is returned to the neutral conductor 18, and this operates the solenoid 60 which engages an appropriate trigger system of the operating mechanism 32 that moves the set of separable contacts 36 from the ON condition to either the OFF condition or the TRIPPED condition. On the other hand, when the switch system 168 of the circuit interrupter 104 is actuated, electricity flows from the electronic circuit 156 through one of the wire 164 and the another wire 166, through the switch system 168, and the electricity is returned through the other of the wire 164 and the another wire 166 back to the electronic circuit 156. This triggers the solenoid 160 to be operated to engage the appropriate trigger system of the operating mechanism 132 that moves the set of separable contacts 136 from the ON condition to either the OFF condition or the TRIPPED condition.

Such movement of the set of separable contacts 36 and/or 136 from the ON condition to either the OFF condition or the TRIPPED condition is the desired operation of the shunt trip circuit interrupter 4 and/or 104. It is reiterated, however, that the configuration of the exemplary shunt trip circuit interrupter 4 and 104 is advantageous by providing shunt trip circuit interruption function while occupying only a single one of the receptacles 12. This advantageously avoids the need of conventional shunt trip circuit interrupters whose housings are undesirable oversized and thus typically occupy one receptacle of an electrical panel in excess of the quantity poles to which the oversized shunt trip circuit interrupter is electrically connected. By configuring the shunt trip circuit interrupters 4 and 104 so that they avoid having to occupy an additional receptacle 12 that would be in addition to the quantity of poles 16A and 16B, for example, to which they are electrically connected, which is also equal to the quantity of sets of separable contacts each contains, this advantageously saves space. This is highly desirable. Moreover, since the shunt trip circuit interrupters 4 and 104 each include only the single actuator knob 96 and 196 without including additional knobs, buttons, or other actuators that are situated at the corresponding exterior 80 and 180, this avoids complications to the shunt trip circuit interrupters 4 and 104, which is further advantageous. Other advantages will be apparent.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A Shunt Trip Circuit Interrupter (STCI) structured to be installed within an electrical panel and being structured to be electrically connected between a line and a load of each of a number of poles of the electrical panel, the electrical panel having a quantity of receptacles each having at most only a single pole of the number of poles, the STCI comprising:

a number of sets of separable contacts, each set of separable contacts of the number of sets of separable contacts comprising a contact and another contact, the contact being structured to be electrically connected with one of the line and the load, the another contact being structured to be electrically connected with the other of the line and the load;

a housing having an interior within which the number of sets of separable contacts are situated, the housing being structured to occupy at most only an amount of receptacles of the electrical panel equal to the number of sets;

an operating mechanism situated within the interior and structured to move each set of separable contacts of the number of sets of separable contacts between at least an ON condition wherein the contact and the another contact are electrically connected together and an OFF condition wherein the contact and the another contact are electrically disconnected from one another; and a tripping mechanism situated within the interior of the housing of the STCI and comprising an electronic circuit, a solenoid electrically connected with the electronic circuit, and a wire electrically connected with the electronic circuit at a first end and extending between the electronic circuit and an exterior of the housing, the wire having a remote switch system that comprises at least one of a manual switch and an electronic switch that, when actuated, electrically connects a second end of the wire to a neutral conductor and actuates the solenoid that engages the operating mechanism which moves each set of separable contacts from the ON condition to the OFF condition.

2. The STCI of claim 1 wherein the tripping mechanism comprises a circuit board that comprises the electronic circuit, the solenoid being situated on the circuit board.

3. The STCI of claim 2 wherein the wire is an extended electrical conductor that has a first end and a second end opposite the first end, the first end having an electrical connection with the circuit board, the second end being situated at an exterior of the housing.

4. The STCI of claim 3 wherein the wire further has another portion situated at a location between the first end and the second end, the another portion extending through the housing.

5. The STCI of claim 4 wherein the wire is structured to be electrically connected with a neutral conductor of the electrical panel and to energize the solenoid to engage the operating mechanism when the switch system actuated.

6. The STCI of claim 3 wherein the tripping mechanism further comprises another wire, the another wire being another extended electrical conductor that has another first end and another second end opposite one another, the another first end having another electrical connection with the circuit board, the another second end being situated at the exterior of the housing.

7. The STCI of claim 6 wherein the wire and the another wire are both structured to be electrically connected with the switch system which, when actuated, energizes the solenoid that engages the operating mechanism which moves each set of separable contacts from the ON condition to the OFF condition.

8. The STCI of claim 6 wherein the housing has an opening formed therein, the wire and the another wire extending through the opening.

9. The STCI of claim 1 wherein each set of separable contacts of the number of sets of separable contacts further comprises an actuator knob that is connected with the operating mechanism and that protrudes to the exterior of the housing, and wherein the housing is free of any other button situated thereon at the exterior of the housing.

* * * * *